United States Patent [19]

Carter

[11] 3,944,839

[45] Mar. 16, 1976

[54] MULTI-WINDMILL WHEEL POWER GENERATOR

[76] Inventor: Frank H. Carter, 428 North St., Taft, Calif. 93268

[22] Filed: July 18, 1974

[21] Appl. No.: 489,815

[52] U.S. Cl.................................. 290/55; 416/198 A
[51] Int. Cl.²......................................... H02P 9/04
[58] Field of Search.......... 416/198; 290/44, 55, 43, 290/54

[56] References Cited
UNITED STATES PATENTS

| | | | |
|---|---|---|---|
| 961,081 | 6/1910 | Barker | 416/198 |
| 1,015,505 | 1/1912 | Moon | 416/198 |
| 1,321,415 | 11/1919 | Brown | 290/55 X |
| 1,633,460 | 6/1927 | Silverstrin | 290/55 |
| 1,654,165 | 12/1927 | Felt | 290/55 |
| 2,339,749 | 1/1944 | Albers | 290/44 |
| 2,388,377 | 11/1945 | Albers | 290/55 |

*Primary Examiner*—Herman J. Hohauser
*Attorney, Agent, or Firm*—Clarence A. O'Brien; Harvey B. Jacobson

[57] ABSTRACT

A power generator driven by multiple windmill wheels rotatably supported for movement about a substantially vertical axis with all of the windmill wheels being drivingly connected to the generator. The windmill wheels are arranged in pairs on opposite sides of a vertical column and shaft assembly with a supporting framework for the windmill wheels being rotatable about a vertical axis and oriented in predetermined relation to the wind direction by a rudder assembly and provided with a governor to increase the load on the windmill wheels when a predetermined speed is reached thereby limiting the rotational speed of the windmill wheels by increasing the generator load.

9 Claims, 7 Drawing Figures

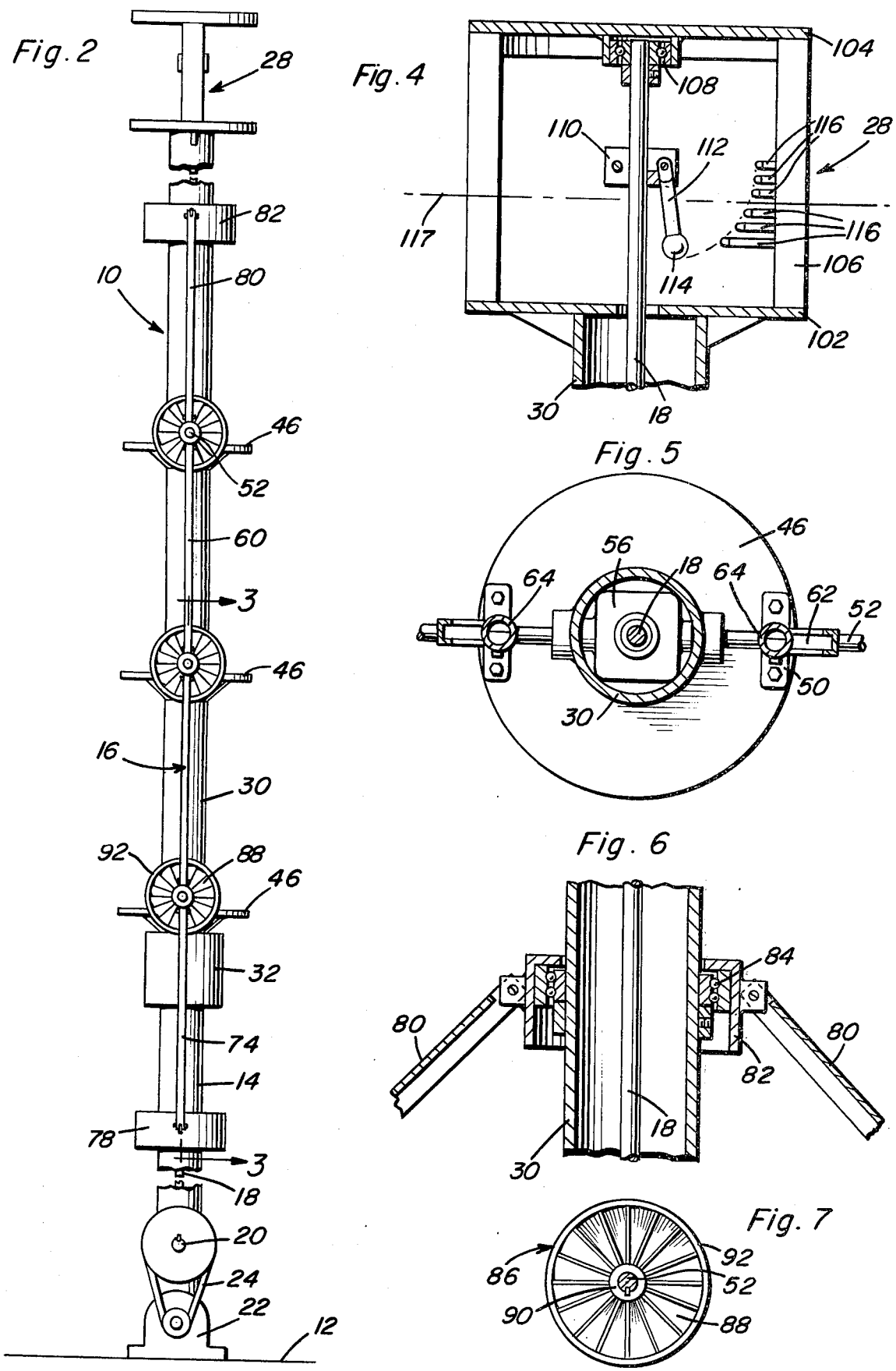

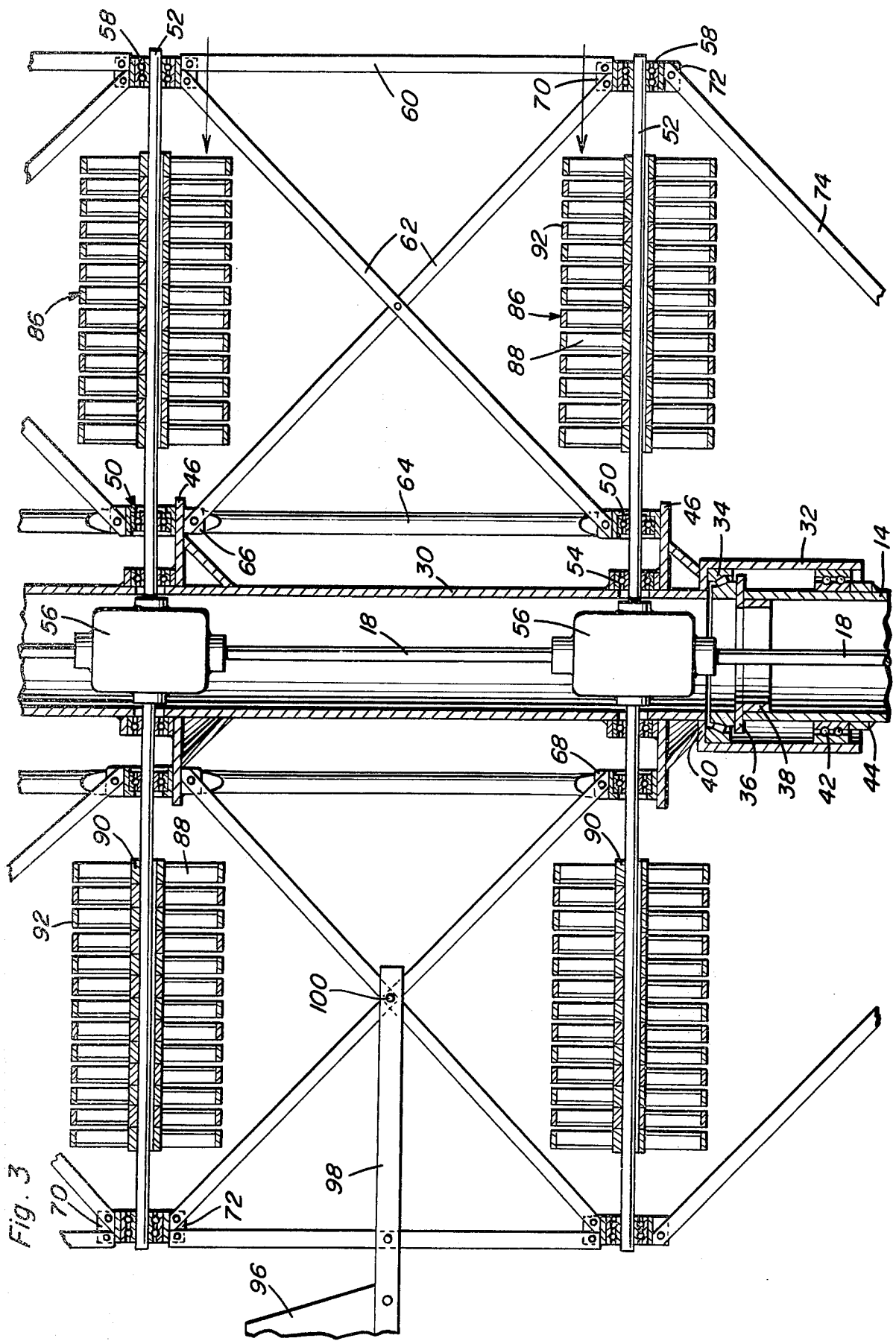

MULTI-WINDMILL WHEEL POWER GENERATOR

BACKGROUND OF THE INVENTION

1. Field of the Invention

The present invention generally relates to a power generator of the type driven by a plurality of windmill wheels to produce electrical energy in response to rotation of the windmill wheels with the invention more particularly related to such an arrangement incorporating a supporting structure for the windmill wheels to enable them to rotate about a vertical axis from a suitable supporting derrick, column or the like together with a governor controlling rotational speed of the windmill wheels.

2. Description of the Prior Art

The following U.S. Pat. Nos. relate generally to this field of endeavor:

| | |
|---|---|
| 554,138 | Feb. 4, 1896 |
| 1,816,632 | July 28, 1931 |
| 2,179,885 | Nov. 14, 1939 |
| 2,273,084 | Feb. 17, 1942 |
| 2,539,862 | Jan. 30, 1951 |
| 2,655,604 | Oct. 13, 1953 |

SUMMARY OF THE INVENTION

An object of the present invention is to provide a power generator driven by a plurality of windmill wheels in the form of axial flow windmill wheels connected to opposite ends of a horizontally disposed shaft rotatably supported in elevated relationship by a supporting structure and a turntable assembly which enables the axis of rotation of the windmill wheels to be maintained in substantially parallel relation to the direction of movement of the air for more effectively driving the windwheel wheels with a plurality of horizontal shafts and windwheel wheel being oriented in vertically spaced relationship. All of which are supported from a framework module for rotational movement about a vertical axis as determined by a wind vane or rudder supported from the framework.

Another object of the invention is to provide a power generator in accordance with the preceding object in which a single vertical drive shaft is supported within a rigid hollow column with the drive shaft being drivingly connected to the horizontal shaft driven by the windmill wheels with the upper end of the drive shaft being connected with a governor for increasing or decreasing the generator load on the vertical drive shaft for controlling rotational speed of the windmill wheels.

A further object of the invention is to provide a power generator in accordance with the preceding objects in which the windmill wheels and framework module may be repeated vertical to enable the capacity of the power generator to be varied.

Still another object of the invention is to provide a power generator in accordance with the preceding objects incorporating a vertical column support in the form of a hollow post or the like in which the framework module and windmill wheels assemblies thereon are rotatably supported and guided with the entire framework module being rigidly braced by peripheral and diagonal brace members to provide a rigid structure.

A further important object of the invention is to provide a power generator driven by multiple windmill wheels which is extremely sturdy in construction, capable of construction with various output capacities, effective in controlling the rotational speed of the windmill wheels and relatively simple and maintenance free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an elevational view of the device taken from the right side of FIG. 1.

FIG. 3 is a vertical sectional view, on an enlarged scale, taken substantially on a plane passing along section line 3—3 of FIG. 2 illustrating the specific structural details of the windmill wheels and related framework structure.

FIG. 4 is a more detailed view, in section, of the governor at the upper end of the drive shaft.

FIG. 5 is a transverse, sectional view taken substantially upon a plane passing along section line 5—5 of FIG. 1 illustrating further structural details of the horizontal drive shaft assembly and gearbox arrangement.

FIG. 6 is a detailed sectional view illustrating the upper end of the framework module.

FIG. 7 is a detailed sectional view taken substantially upon a plane passing along section line 7—7 of FIG. 1 illustrating further structural details of one of the windmill wheels.

DESCRIPTION OF THE PREFERRED EMBODIMENT

Figure 1:
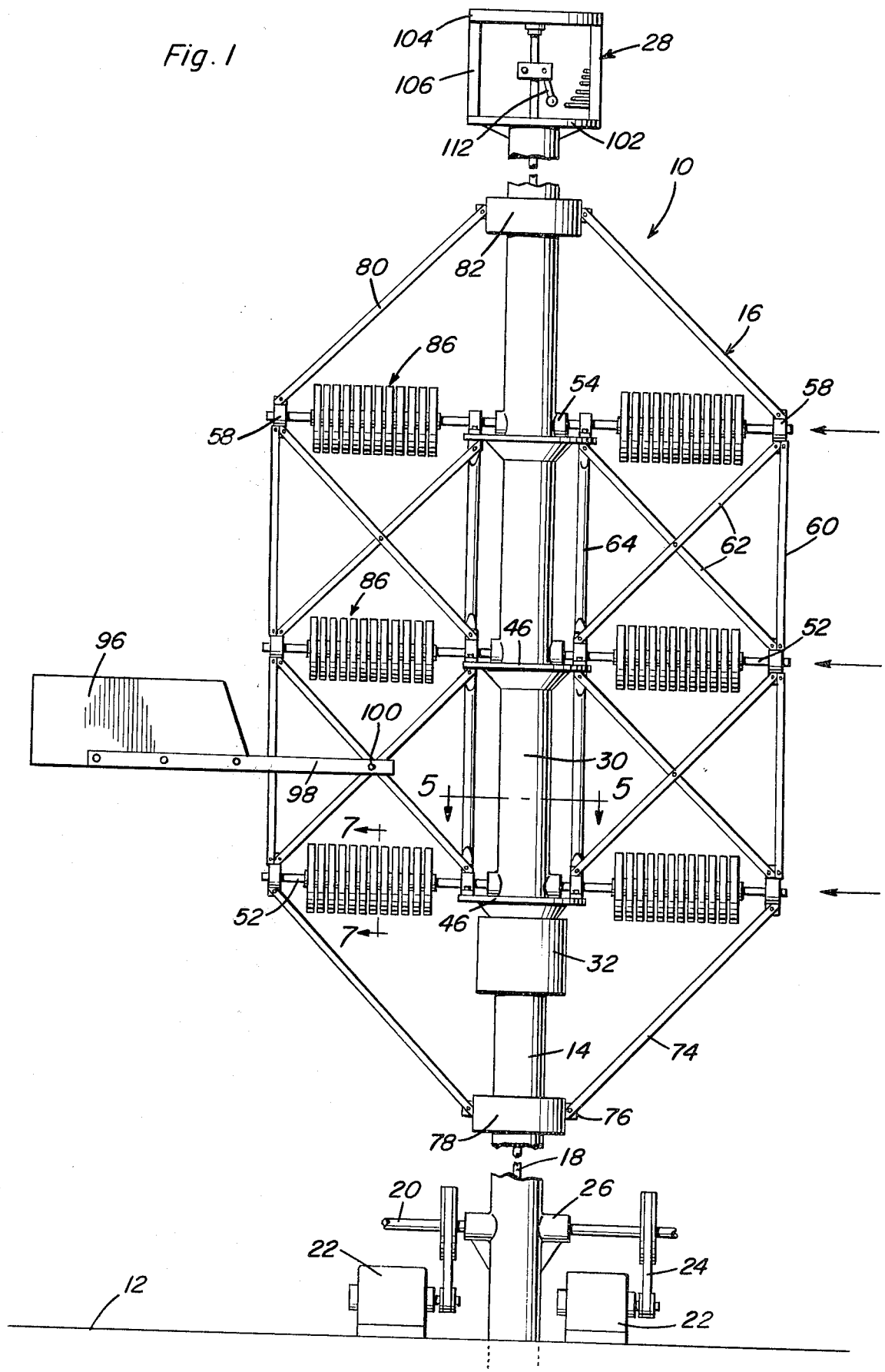
FIG. 1 is a side elevational view of the power generator of the present invention illustrating one module thereof with vertical portions broken away indicating the indeterminate height and capacity of the device.

Referring now more specifically to the drawings, the power generator of the present invention is generally designated by reference numeral 10 and is supported in vertical orientation from a ground surface or other support surface 12. The power generator 10 includes a vertically disposed hollow supporting member 14 which may be in the form of a post, rigid pipe or the like that has its lower end anchored into the supporting surface in any suitable manner. Supported from the hollow column or post 14 is a windmill wheel and framework modules generally designated by numberal 16 with it being pointed out that the number of module 16 may be varied by superimposing modules in vertical alignment. The arrangement disclosed includes a single module but it is pointed out that the supporting structure is broken away both above and below the module 16 as illustrated in FIG. 1 thus indicating that the height of the power generator 10 may be varied.

Supported within the hollow column or post 14 is a vertical drive shaft 18 supported therein by any suitable means such as bearing spiders and the like, the details of which are not shown. The lower end of the drive shaft 18 is drivingly connected to horizontally disposed output shafts 20 of indeterminate lengths which drive generators 22 through suitable drive connections such as V-belt drive 24, chain belt drives or any other suitable drive connection. The length of the shaft 20 may vary and the number of generators driven therefrom may vary with the generators being of suitable capacity and supported in a suitable manner. A gearbox or beveled gear drive connection may be provided between the drive shaft 18 and the generator drive shaft 20 with any suitable bearings provided for the shaft 20 including inner support bearings 26 or the like. Depending upon the length of the shaft 20, intermediate supporting bearings for the shaft may be provided in any suitable manner. Thus, as the shaft 18 is rotated due to its driving connection with the windmill wheel and framework module 16, the generators 22 will be driven at a desired rotational speed with the number of generators producing electrical energy being varied by a governor assembly generally designated by numeral 28 to increase or decrease the load on the shaft 18 in response to rotational speed of the shaft 18 for maintaining a predetermined upper limit for the rotational speed of the shaft 18.

The windmill wheel and framework module 16 includes a vertically disposed tubular column or post 30 that forms a continuation of the stationary column or post 14 but which is rotatable in relation thereto by virtue of a larger cylindrical collar 32 at its lower end telescoped over the upper end of the column 14 in concentric spaced relation thereto. A tapered or inclined roller-type thrust bearing assembly 34 is provided between the upper end of the collar 32 and an annular plate 36 rigidly fixed to the upper end of the column 14. The plate 36 includes a tubular sleeve 38 telescoped into and rigidly secured to the upper end of the column 14 and the collar 32 includes an inwardly extending annular plate 40 joining the tubular column 30 with the collar 32. The thrust bearing 34 rotatably supports the column 30 in alignment with and on the upper end of the column 14. A ballbearing assembly 42 is interposed between the lower end of the collar 32 and the outer surface of the column 14 with the bearing assembly engaging a retainer collar 44 on the column 14. This arrangement stabilizes the column 30 and maintains it in alignment with the column 14 for rotational movement about a vertical axis.

Rigidly fixed to the column 30 is a plurality of vertically spaced plates 46 of circular configuration or the like reinforced and rigid with the column 30 by the use of reinforcing gussets. Plates 46 include diametrically opposed bearing blocks 50 thereon which receive and journal the horizontal drive shaft 52 which extends interiorly of the column 30 through a bearing assembly 54 mounted on the periphery of the column 30 and at the inner edge of the plates 46 as illustrated in FIG. 3. The horizontal drive shaft 52 passes into a gearbox 56 disposed interiorly of the column 30 for driving engagement with the vertical drive shaft 18 which also extends into the gearbox 56. In each instance, the drive shaft 52 extends into the gearbox 56 from both directions and the drive shaft 18 extends into the gearbox 56 in both directions. The gearbox 56 is commercially available and is constructed so that rotational input of the drive shaft 52 wll be drivingly connected to the vertical drive shaft 18. The outer ends of the drive shaft 52 are supported by bearing assemblies 58 that are interconnected by vertical frame members 60 and diagonal braces 62 that are connected to vertical frame member 64 in adjacent relation to the column 30 with the vertical member 64 being connected to brackets 66 on the under surface of the plates 46 and brackets 68 on the pillow block 50 with the diagonal and intersecting braces 62 being also attached to these brackets. The vertical frame members 60 and the outer ends of the braces 62 are connected to brackets 70 and 72, respectively, on the bearing assemblies 58. The lowermost bearing assembly 58 has a diagonal brace 74 attached to the bracket 72 with the inner end of the brace 74 being connected to a bracket 76 on a sleeve 78 rotatably journaled on the stationary column 14 for stabilizing the framework. The uppermost bearing assembly 58 has an upwardly inclined diagonal brace 80 connected to the bracket 70 thereon with the upper end of the brace 80 being connected to a collar 82 journaled on the upper end of the column 30 as illustrated in FIG. 6, in which a bearing assembly 84 is interposed between the collar 82 and the column 30. With this construction, both the upper and lower end of the framework is stabilized and the crossed braces 62 also stabilize the frame members 60 and 64 thus forming a rigid module 16 which can swivel about the vertical axis of the stationary tubular column or post 14.

Rigidly affixed to each of the horizontal drive shafts 52 is a plurality of windmill wheels 86 each of which is in the form of a windmill wheel and includes a plurality of radial inclined blades 88 extending from a central hub 90 and being connected at their peripheral edges by a ring 92. As wind approaches the windmill wheels 86 in the direction indicated by the arrows 94 in FIG. 3, the impingement of the air on the blades and passage of the air therethrough will cause rotation of the shaft 52. As illustrated, the windmill wheels 86 are oriented on both sides of the column 30 to increase the efficiency of converting the forces exerted by the wind to rotational movement of the vertical drive shaft 18 through the shaft 52, gearbox 56 to the shaft 18. For maintaining the windmill wheels in proper orientation in relation to the direction of the wind, an enlarged rudder 96 is mounted on the framework module 16 by suitable bracket members 98 which are oriented in generally horizontal position in intersecting relation to the vertical frame members 60 and the cross brace member 62 and secured thereto by suitable fasteners 100. Thus, the rudder 96 will maintain the windmill wheel and framework module 16 properly oriented in parallel relation to the direction of the wind so that wind approaching the windmill wheels 86 will effectively pass through the windmill wheels in an axial direction for causing rotation of the shaft 52.

The governor 28 includes vertically spaced plates 102 and 104 rigidly interconnected by side members 106. The lower plate 102 is rigidly affixed to the upper end of the column 30 and the upper plate 104 is provided with a bearing assembly 108 journaling the upper end of the vertical drive shaft 18 as illustrated in FIG. 4. A clamp bracket 110 is adjustably mounted on the shaft 18 and a pivot arm 112 is mounted thereon with a weight or ball 114 on the free end thereof so that arm 112 will assume a downwardly depending position as illustrated in FIG. 4 when at rest or at a relatively slow speed. As the speed of the shaft 18 increases, the arm 112 will swing outwardly so that the end 114 thereof will move toward horizontal position. Switch contacts 116 are oriented in vertically spaced relation above and below a horizontal reference line 117 indicating normal operating speed for shaft 18 so that as the speed of the shaft 18 increases above the normal speed, the weighted end 114 will engage the contacts 116 above reference line 117 in a progressive manner. When the shaft 18 reaches a predetermined above normal speed, it will contact a switch contact 116 to add a second generator onto the load on the drive shaft 18. If the speed increases further, additional generators will be added onto the load on the shaft 18. Suitable switch mechanisms and control devices such as electro-magnetic clutches and the like are provided in the drive system for the generators to enable them to be added onto the load of the drive shaft or removed therefrom in response to the rotational speed of the shaft 18. When the shaft speed decreases and the end of arm 112 descends below the reference line 117, engagement of contacts 116 will remove generators from the line and cut in an auxiliary power system when only one generator remains on the line and the shaft speed is still too low. By increasing and decreasing the load on the shaft 18, the windmill wheels will be controlled as to their rotational speed thereby avoiding the possibility of damage to the windmill wheels or the other mechanism due to overspeeding of the windmill wheels. In the event insufficient wind exists to rotate the windmill wheels, a standby power mechanism such as an internal combustion engine or an electric motor driven from storage batteries may be provided for rotating the shaft 20 through a suitable one-way clutch or the like. Such devices may be automatically actuated in response to the rotational speed of the shaft 18 or the shaft 20 so that when the shaft 18 or the shaft 20 slows down to a predetermined minimum speed, auxiliary power devices will be automatically cut in. The specific structure of the automatic auxiliary power devices, their connection with the shaft 20 and the circuit associated with the switch contacts 116 and switch contacts themselves are not specifically illustrated since various structures may be employed for this purpose.

This arrangement provides for a single column structure with all of the components being supported from the single supporting post or column 14 with the modules 16 being repeated vertically to whatever height desired to vary the output capacity of the power generator. The rudder 96 is of sufficient size to maintain the directional attitude of the windmill wheels during their maximum torque output for rotating the vertical drive shaft 18 which rotates the shaft 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A power generator comprising a supporting stationary column, a windmill wheel module rotatably supported from said column for swivelling movement about a substantially vertical axis, vertically spaced horizontal shafts rotatably journaled on the module and extending diametrically of the vertical axis, a plurality of windmill wheels mounted on each end of each horizontal shaft for rotating the shaft in response to axial flow of wind therethrough, a vertical shaft supported from the column and drivingly connected to the horizontal shafts, a generator assembly supported at the lower end of the column and being drivingly connected to the vertical shaft, and rudder means rigidly connected with the module for maintaining the rotational axis of the horizontal shaft generally parallel to the wind direction.

2. The structure as defined in claim 1 wherein said module includes a plurality of vertically spaced plates having the inner portions of the horizontal shafts journaled on the upper surface thereof.

3. The structure as defined in claim 2 wherein said windmill wheels are disposed radially outwardly of the plates to enable variation in the diameter of the windmill wheels and variation in the number of windmill wheels on the horizontal shafts.

4. The structure as defined in claim 3 together with governor means connected to the vertical shaft driven from the horizontal shafts, said governor means including a weighted arm pivotally attached to said vertical shaft and extending radially therefrom and normally being disposed in a downwardly inclined position but capable of pivotal movement to a horizontal position in response to rotational movement of the vertical shaft, contact means engageable by the swinging arm when moving toward horizontal position effective to increase the load on the vertical shaft when the rotational speed of the vertical shaft exceeds a predetermined rpm.

5. The structure as defined in claim 1 wherein said module includes a hollow tubular member aligned with the column, a depending collar on said tubular member journaled on the upper end of the column, said vertical shaft extending throughout the length of the tubular member, means drivingly connecting said horizontal shafts to the vertical shaft internally of the tubular member, a framework rigid with the tubular member and extending outwarly therefrom and journaling the outer ends of the horizontal shafts therefrom.

6. The structure as defined in claim 5 wherein said framework includes downwardly and inwardly extending braces rotatably connected to the column below the collar for stabilizing the module in relation to the column.

7. The structure as defined in claim 6 wherein said module is adapted to be repeated vertically to vary the output, and governor means at the upper end of the module for controlling the rotational speed of the vertical shaft by varying the load thereon in response to the rotational speed thereof.

8. In a wind driven power generator, a windmill wheel module comprising a hollow column supported for swivelling movement about a vertical axis, a plurality of vertically spaced horizontal shafts journaled on said column and extending radially therefrom, said shafts having end portions disposed outwardly of said column, a framework supported rigidly from said column and rotatably supporting the outer ends of said shafts, at least one windmill wheel mounted on each end of each shaft, and means drivingly connected to said horizontal shafts for generating electrical energy.

9. The structure as defined in claim 4 wherein said module includes a hollow tubular member aligned with the column, a depending collar on said tubular member journaled on the upper end of the column, said vertical shaft extending throughout the length of the tubular member, means drivingly connecting said horizontal shafts to the vertical shaft internally of the tubular member, a framework rigid with the tubular member and extending outwardly therefrom and journaling the outer ends of the horizontal shafts therefrom.

* * * * *